United States Patent [19]

Hashimoto et al.

[11] Patent Number: 5,335,634
[45] Date of Patent: Aug. 9, 1994

[54] COMBUSTION CHAMBER STRUCTURE FOR AN ENGINE

[75] Inventors: Kazuhiko Hashimoto; Yoshihiko Imamura; Toshihide Yamamoto; Yoshihisa Noh, all of Hiroshima, Japan

[73] Assignee: Mazda Motor Corporation, Hiroshima, Japan

[21] Appl. No.: 883,335

[22] Filed: May 14, 1992

[30] Foreign Application Priority Data

May 14, 1991 [JP] Japan .................. 3-139810
Jun. 29, 1991 [JP] Japan .................. 3-185757

[51] Int. Cl.$^5$ .............................. F02B 31/00
[52] U.S. Cl. .................. 123/188.14; 123/308; 123/193.5
[58] Field of Search .......... 123/308, 432, 188.14, 123/193.5

[56] References Cited

U.S. PATENT DOCUMENTS

| | | | |
|---|---|---|---|
| 4,523,559 | 6/1985 | Latsch et al. | 123/188.14 |
| 4,669,434 | 6/1987 | Okumura et al. | 123/188.14 |
| 4,700,669 | 10/1987 | Sakurai et al. | 123/188.14 |
| 4,811,231 | 3/1989 | Hataoka et al. | 123/188.14 |
| 4,858,567 | 8/1989 | Knapp | 123/188.14 |
| 4,995,359 | 2/1991 | Yokoyama et al. | 123/188.14 |
| 5,065,712 | 11/1991 | Hundleby | 123/188.14 |
| 5,076,224 | 12/1991 | Smith, Jr. et al. | 123/188.14 |
| 5,081,965 | 1/1992 | Walters et al. | 123/188.14 |
| 5,099,808 | 3/1992 | Matsuura et al. | 123/188.14 |
| 5,138,989 | 8/1992 | Fraidl et al. | 123/308 |
| 5,159,909 | 11/1992 | Kobayashi | 123/188.14 |

FOREIGN PATENT DOCUMENTS

| | | | |
|---|---|---|---|
| 52-32812 | 3/1977 | Japan . | |
| 59-51647 | 12/1984 | Japan . | |
| 2115486 | 9/1983 | United Kingdom | 123/188.14 |

*Primary Examiner*—E. Rollins Cross
*Assistant Examiner*—Erick Solis
*Attorney, Agent, or Firm*—Keck, Mahin & Cate

[57] ABSTRACT

A combustion chamber for an engine is provided between a cylinder bore formed in a cylinder block, a generally conically-shaped wall formed in an under wall of a cylinder head, and a piston in the cylinder bore. The combustion chamber has a structure into which an intake port opens so as to introduce an intake air flow closer to a marginal portion than a central portion of the combustion chamber, thereby generating a swirl flow of intake air in the combustion chamber. The combustion chamber also includes a curved air flow guide wall formed in the generally conically-shaped wall which extends from near the intake port so as to approach the cylinder bore surface gradually, thereby generating what is termed a squish flow of intake air.

6 Claims, 8 Drawing Sheets

COMBUSTION CHAMBER STRUCTURE FOR AN ENGINE

BACKGROUND OF THE INVENTION

1. Field of the Invention

This invention relates to a combustion chamber structure for an engine and, more particularly, to a combustion chamber structure in which a "swirl effect" of intake air is utilized in order to promote combustibility in a combustion chamber.

2. Description of Related Art

It has been known to provide a swirl effect, i.e., an induction turbulence effect, to intake air supplied to an engine in order to improve combustion performance of the engine. An intake port which opens at a combustion chamber formed in a cylinder head has a shape which is properly designed so as to let the intake air, introduced from the intake port, swirl in the combustion chamber during an intake stroke of the engine for promotion of mixture of fuel and air. In such a combustion chamber structure, the intake port for producing a swirl flow of the intake air (which is hereinafter referred to as a "swirl port") is generally provided so that a center line of the swirl port points in a tangential direction of a cylindrical inner surface of the cylinder. Such an intake port construction is described in, for example, Japanese Utility Model Publication No. 52-32,812.

However, the combustion chamber of this publication can cause a problem in that intake air flowing from the swirl port into the combustion chamber, in particular, intake air which is directed towards the periphery of the combustion chamber, is interfered with by a wall surface of the combustion chamber. As a result, production of the swirl flow is impaired.

Typically, an intake valve and an exhaust valve are operated at a proper timing so as to introduce intake air into the cylinder and discharge burned gases from the cylinder. Such intake and exhaust valves have "conical-frustrum" valve heads, which are otherwise well known as poppet type or mushroom type valve heads, on tip ends of their valve stems. These valves are reciprocally moved in straight lines, respectively, so as to open and close the intake and exhaust ports. In an engine of the type described in, for example, Japanese Patent Publication No. 59-51,647, a downstream portion of an intake port is curved to open towards an inner face of the cylinder so as to cause a swirl flow of intake air, in particular, when the engine operates at low loads wherein only a small amount of intake air is introduced into the cylinders, thereby promoting mixing of fuel and air and improving the combustibility or output performance of the engine.

In an engine having such poppet type intake valves in intake ports, the conical-frustrum valve head of an intake valve tends to obstruct the flow of intake air when the intake air flows from the opening of the intake port into the cylinder during the intake stroke, increasing resistance to the intake air. Such an increase in resistance may possibly result in impeding an increase in air charging efficiency. Moreover, curving the intake port so as to produce a swirl flow, i.e., an induction turbulence, of the intake air in the cylinder breaks the force of flow of the intake air into the cylinder, so that a suitable swirl flow is not produced.

Figure 1:
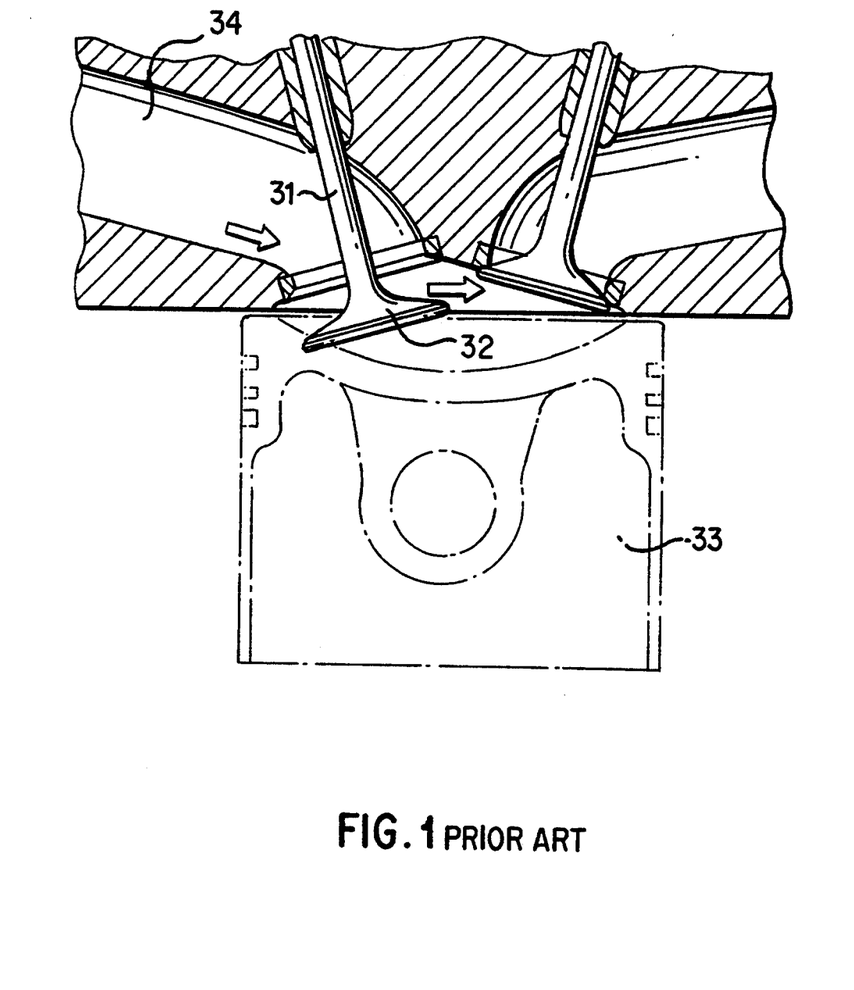
FIGS. 1 and 2 are schematic sectional illustrations of conventional combustion chamber structures.

For the purpose of providing a more detailed description that will enhance an understanding of the operation of a poppet type valve such as that described above, reference is made to FIGS. 1 and 2. In an engine constructed as shown in FIG. 1, intake air, which is introduced into a cylinder 33 through an intake port 34 while an intake valve 31 is opened, impinges on a valve face of a conical-frustrum valve head 32 of the intake valve 31, so that its direction of flow is changed from an obliquely downward direction along the intake port 34 to an approximately horizontal direction. Owing to the directional change, it is hard to smoothly introduce the intake air into the cylinder 33, resulting in an increase in resistance to its flowing in the cylinder.

Figure 2:
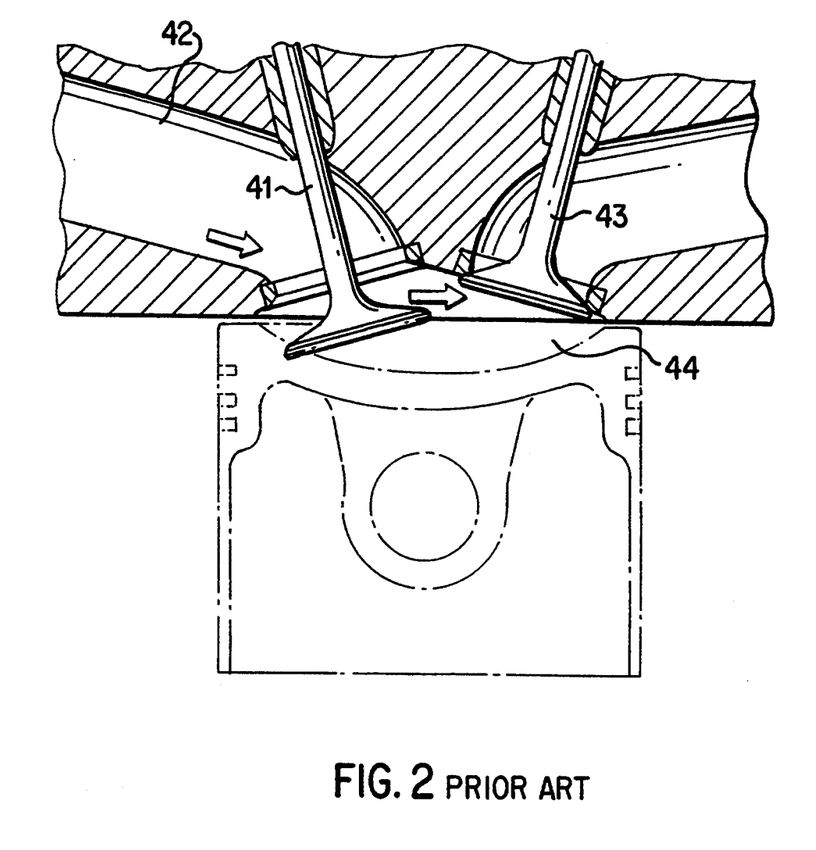

Even if poppet types of intake valves 41 and exhaust valves 43 are designed with angles which properly allow intake air to flow in through the intake port 42 and pass over the conical-frustrum valve head of the intake valve 41 without changing its direction of flow as shown in FIG. 2, depending upon the relation between the direction of intake air flow and an angle of inclination of the exhaust valve 43 with respect to the intake port 42, there is caused an impingement of the intake air, passed over the conical-frustrum valve head of the intake valve 41, on an under surface the exhaust valve 43. In such a case, it is hard to smoothly introduce the intake air into the cylinder 44, so as to increase its flowing resistance with respect to the cylinder.

SUMMARY OF THE INVENTION

It is one object of this invention to provide a combustion chamber structure for an engine in which an intake port is formed so as to introduce and direct an intake air flow closer to a marginal portion than a central portion of a combustion chamber, thereby generating effectively a swirl flow of intake air in the combustion chamber and providing an improved combustibility of an air-fuel mixture by the engine.

It is another object of this invention to provide a combustion chamber structure for an engine in which resistance of an intake air flow against the combustion chamber and its associated elements is minimized so as to realize an increase in charging efficiency of intake air, thereby providing a powerful swirl flow of intake air in the combustion chamber.

The foregoing objects of the present invention are accomplished by providing a combustion chamber structure which is constructed by a cylinder block formed with a cylinder bore therein and a cylinder head formed with a generally conically-shaped under wall, which is mounted on the cylinder block so as to form a combustion chamber between the cylinder bore, the generally conically-shaped under wall and a piston in the cylinder bore. An intake port is formed in the cylinder head and opens into the combustion chamber so as to introduce and direct an intake air flow into the combustion chamber closer to a marginal portion than to a central portion of the combustion chamber so as to generate a swirl flow of intake air, i.e., an induction turbulence of intake air, in the combustion chamber. The combustion chamber is formed with an air flow guide means including an upstream curved wall portion formed in the generally conically-shaped under wall downstream of an end opening of the intake port. The curved wall portion extends from a side of the end opening of the intake port remote from the center line of the intake port with respect to a center of the combustion chamber so as to generally approach spatially an inner surface of the cylinder bore in a direction in which the swirl flow of intake air travels. The air flow guide means of the combustion chamber further includes a downstream curved wall portion formed in the generally conically-shaped under wall. The downstream curved wall portion extends successively downstream from the upstream curved wall portion so as to gradually approach the center of the combustion chamber, thereby generating a "squish" flow of intake air, i.e., a compression turbulence. In the intake port, there is disposed a fuel injector so as to direct a fuel jet towards the central portion of the combustion chamber.

Another intake port is formed in addition to the intake port in the cylinder head. This other intake port opens into the combustion chamber so as to introduce and direct an intake air flow closer to the central portion of the combustion chamber. In the other intake port, a shutter valve is disposed. The shutter valve opens to allow intake air to be introduced into the combustion chamber through the other intake port while the engine operates at lower loads.

In a specific embodiment, the combustion chamber is constructed so that, letting angles A, B, C and D be, respectively, an angle between a center line of a major straight portion of the intake port and an interface between the cylinder head and the cylinder block, an angle between a center line of an intake valve having a poppet type of, for instance, generally conically-shaped valve head and a vertical center line of the cylinder bore, a base angle of the generally conically-shaped valve head, and an angle between a center line of a poppet type of, for instance, a generally conically-shaped exhaust valve installed oppositely to the intake valve with respect to the vertical center line of the cylinder bore and the vertical center line of the cylinder bore. These relative angles A, B, C and D satisfy the following formulas:

$$C \geq A+B \text{ and}$$

$$C \geq B+D$$

Providing the air flow guide means in the generally conically-shaped combustion chamber wall generates stably a swirl flow of intake air after the intake port and a squish flow of intake air at the center portion of the combustion chamber, so as to promote mixing of air and fuel in the combustion chamber.

Establishing the relative angles A, B, C and D of the intake and exhaust valves 12 and 14 as set forth above reduces resistance of intake air flow against the intake and exhaust valves, so as to enable intake air to be charged into the combustion chamber at an increased rate.

BRIEF DESCRIPTION OF THE DRAWINGS

The above and other objects and features of the present invention will be apparent to those skilled in the art from the following description of preferred embodiments thereof when considered in conjunction with the appended drawings, wherein the same reference numerals have been used to designate the same or similar elements throughout the drawings, and in which.

DETAILED DESCRIPTION OF THE PREFERRED EMBODIMENTS

Figure 3:
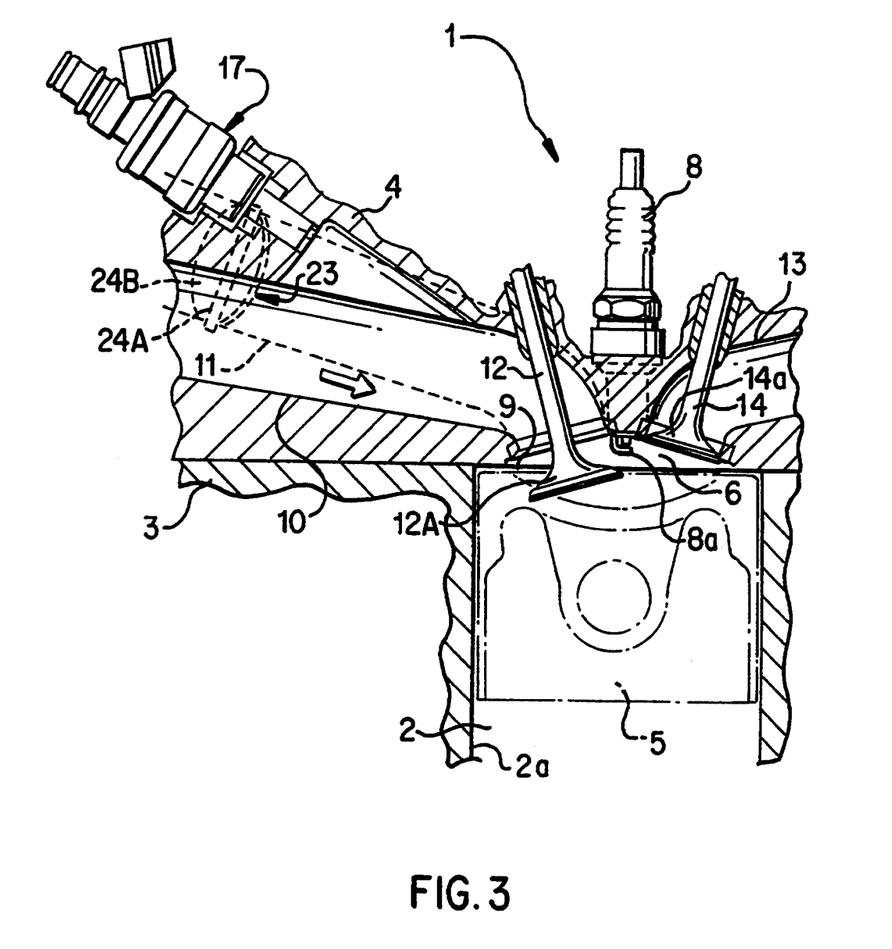
FIG. 3 is a sectional view of a combustion chamber structure according to a preferred embodiment of the present invention.
Figure 4:
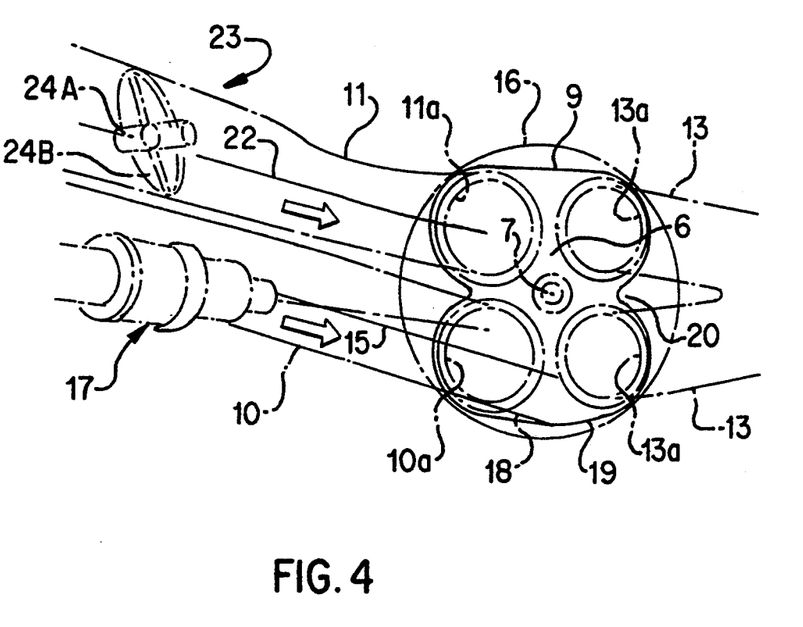
FIG. 4 is a plan view of a cylinder head of the combustion chamber shown in FIG. 3.

Referring to FIGS. 3 to 7 in detail and, in particular, to FIGS. 3 and 4, a combustion chamber structure according to a preferred embodiment of the present invention is shown. An engine 1 has a cylinder block 3 and a cylinder head 4 mounted on the cylinder block 3. The cylinder block 3 is formed with a plurality of cylinder bores 2a (only one of which is shown) for defining cylinders 2 in which a piston 5 reciprocates or slides up and down. The cylinder head 4 is formed at its bottom with a generally conically-shaped wall 9 (which is hereafter referred to a conical wall for simplicity). A combustion chamber 6 is formed in the cylinder 2 by the top of the piston 5, the cylinder bore 2a and the conical wall 9. The cylinder head 4 is formed with a spark plug mount bore 7 so as to mount and hold a spark plug 8 at a center of the combustion chamber 6 with a tip end 8a of the spark plug 8 projected within the combustion chamber 6. On one side of the spark plug mount bore 7, there are bored a first intake or swirl port 10, which is shaped and opens into the combustion chamber 6 so as to produce a swirl flow, i.e., an induction turbulence, of intake air, and a second intake or secondary port 11, which is shaped and opens into the combustion chamber 6 and is effective when the engine operates at higher loads. Each port 10 or 11 is opened and closed by a poppet type intake valve 12 having a generally conically-shaped valve head 12A (only one of which is shown) at a predetermined timing. On the other side of the spark plug mount bore 7, there are bored a pair of exhaust ports 13, which are arranged side by side so as to open into the combustion chamber 6 oppositely of the swirl port 10 and the secondary port 11, respectively. The exhaust ports 13 are opened and closed, by poppet type exhaust valves 14, each having a generally conically-shaped valve head 14A (only one of which is shown), at a predetermined timing. As is more clearly shown in FIG. 4, the swirl port 10 is provided with a fuel injection valve 17 so as to direct a fuel jet toward almost a center of a cross-sectional contour circle 16 of the cylinder 2, intersecting a center line 15 of the swirl port 10.

Secondary port 11 is so formed as to have its center line 22 directed towards almost the center of the combustion chamber 6. The secondary port 11 is equipped with a shutter valve means 23 midway therein, which is closed to shut the secondary port 11 while the engine operates at lower loads so that only the swirl port 10 supplies intake air into the combustion chamber 6. As is clearly shown in FIG. 4, the shutter valve means 23 comprises a valve shaft 24A and a shutter blade 24B. The shutter blade 24B is fixedly supported for turning movement by the valve shaft 24A, which is perpendicular to the center line 22 of the secondary port 11 and extends substantially vertically, as viewed from a side of the engine, and is rotatable with respect to the secondary port 11. The shutter valve 23 is designed and adapted so as to forcibly deflect and direct an intake air flow in the secondary port 11 towards and closer to a central portion than to a marginal portion of the combustion chamber 6 when it is opened.

Figure 5:
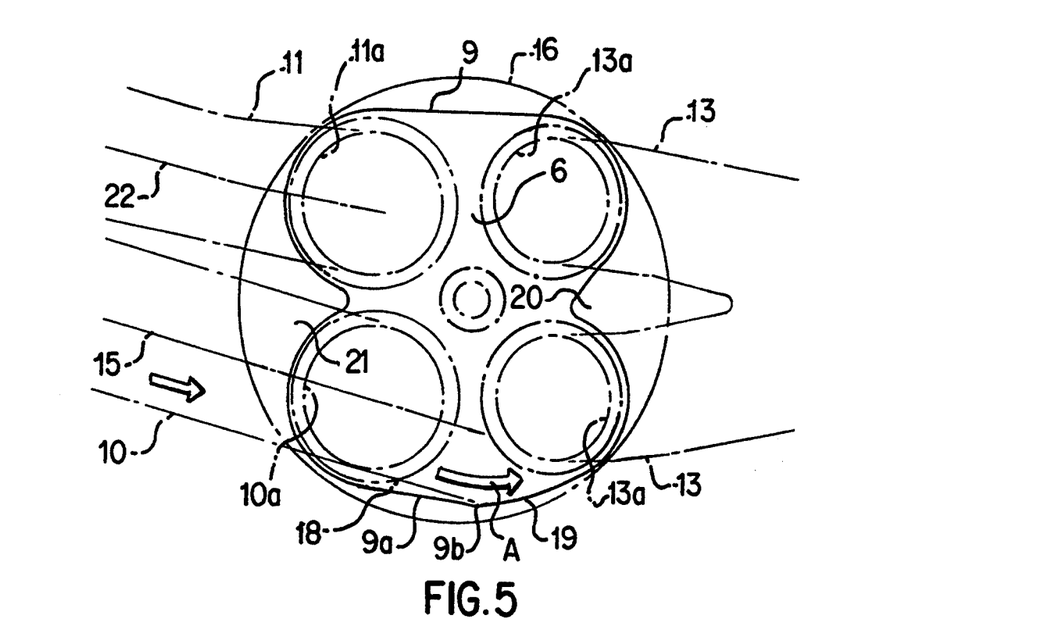
FIGS. 5 and 6 are plan views of the combustion chamber structure shown in FIG. 3.

As is shown in detail in FIG. 5, the conical wall 9, forming an upper wall of the combustion chamber 6, is formed with a straight wall portion 9a on one side of an end opening 10a of the swirl port 10 radially remote from the other side of the end opening 10a close, in a radial direction, to the center of the combustion chamber 6. The conical wall 9 is also formed with a curved guide wall portion, namely, a swirl guide wall portion 19, extending in the counterclockwise direction, as viewed from above the combustion chamber 6, from an intersection 9b of the straight wall portion 9a with a straight line 18, which the end opening 10a of the swirl port 10 is circumscribed with, and is parallel to the center line 15 of the swirl port end opening 10a, so as to approach the cross-sectional contour circle 16 of the cylinder bore 2a gradually. After a point of contact of the swirl guide wall portion 19, the conical wall 9 of the combustion chamber 6 extends along the periphery of a pair of end openings 13a of the exhaust ports 13 so as to form a first projected squish guide wall portion, namely, a first squish guide wall portion 20, projecting towards the center of the combustion chamber 6 between the end openings 13a of the exhaust ports 13. Because the distance of the first squish guide wall portion 20 from the center of the combustion chamber 6 becomes gradually short in the counterclockwise direction, the swirl flow of intake air easily separates from the conical wall 9 of the combustion chamber 6 along the first half of the first squish guide wall portion 20 continuing from the swirl guide wall portion 19, so as to form a squish flow, i.e., a compression turbulence, of intake air.

Similarly, the conical wall 9 of the combustion chamber 6 extends along the peripheries of the end opening 10a of the swirl port 10 and an end opening 11a of the secondary port 11 so as to form a second projected squish guide wall portion, namely, a second squish guide wall portion 21, projecting towards the center of the combustion chamber 6 between the end opening 10a of the swirl port 10 and the end opening 11a of the secondary port 11.

Figure 6:
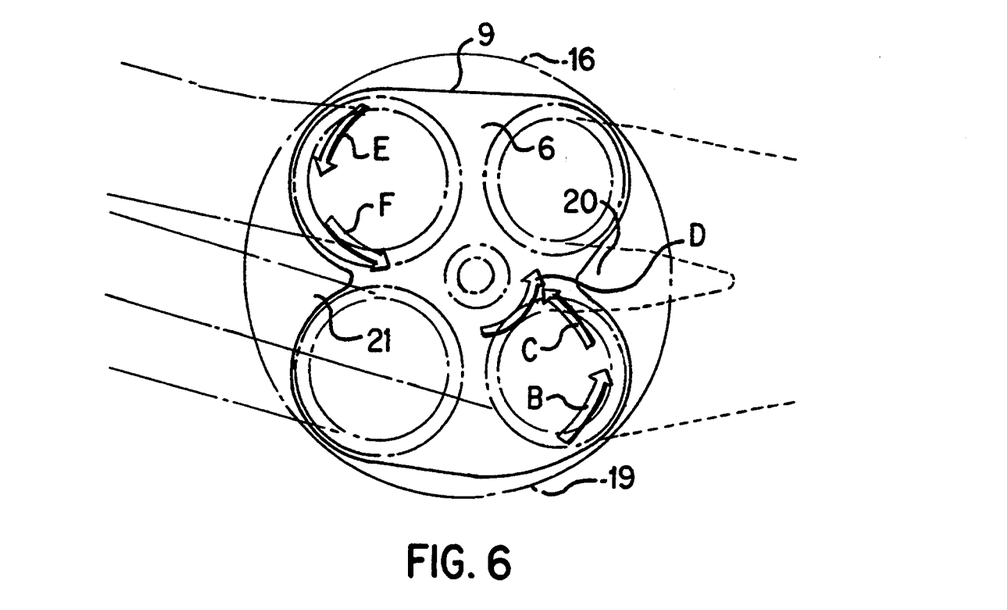

In operation, as shown in FIGS. 5 and 6, in an intake stroke, while the engine operates at low loads, intake air is introduced into the combustion chamber 6 through the swirl port 10 only so as to form a swirl flow, i.e., an induction turbulence, of intake air. The intake air flow A, introduced into the combustion chamber 6 through the swirl port 10, is guided by and along the curved swirl guide wall portion 19, gradually changing in direction of flow along the curved swirl guide wall portion 19, so as to form a helical flow of intake air along the inner surface of the combustion chamber 6.

When the engine 1 changes to a compression stroke from the intake stroke, a swirl flow of intake air B, produced immediately after the end opening 10a of the intake port 10, changes its direction of flow so as to form a squish flow C, i.e., a compression turbulence, and is directed towards the center of the combustion chamber 6 as it is guided along the first half or upstream side of the first squish guide wall portion 20. The squish flow C of intake air and a small radius swirl flow D of intake air produced and swirling near the center of the combustion chamber 6 mutually act on each other with a shearing effect, generating a strong turbulence of intake air at the central portion of the combustion chamber 6. Consequently, a mixing of air and fuel around the center of the combustion chamber 6 is promoted, so that the combustibility of the fuel mixture by the engine is improved. Simultaneously, a swirl flow E of intake air is changed in direction of flow by and along the upstream side of the second squish guide wall portion 21, so as to change to a squish flow F of intake air directed towards the center of the combustion chamber 6. This squish flow F of intake air promotes the mixing of air and fuel around the central portion of the combustion chamber 6.

Since the fuel injection valve 17 is disposed in the swirl port 10 so as to point towards almost the center of the combustion chamber 6, adhesion of fuel on the wall and concentration of fuel mixture at the marginal portion of the cylinder bore 2a are prevented, providing a suitable combustibility. In addition, since the shutter valve 23, disposed in the secondary port 11, is fixedly supported by the drive shaft 24 perpendicular to the center line 22 of the secondary port 11 and is adapted to deflect and direct an intake air flow in the secondary port 11 towards near the center of the combustion chamber when it is opened, intake air passed through the secondary port 11 is forced to enter into the central portion of the combustion chamber 6, so as to produce a stable swirl flow of intake air.

Figure 7:
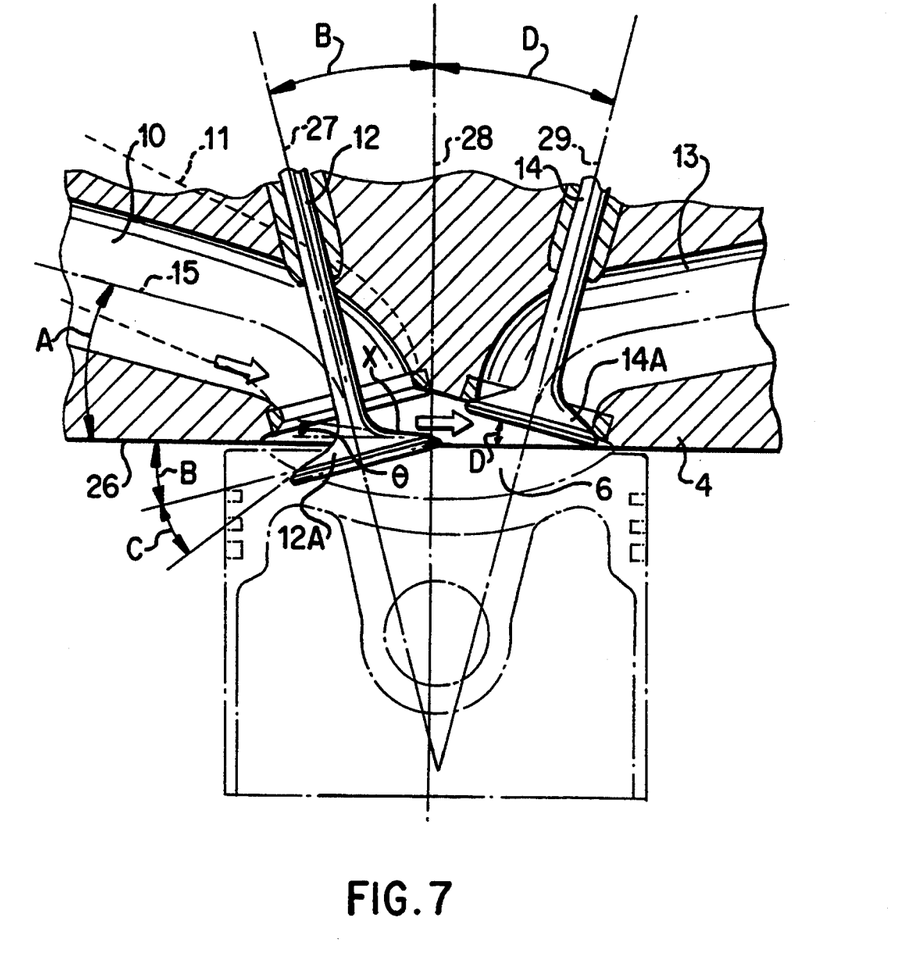
FIG. 7 shows angle details of the combustion chamber structure shown in FIG. 3.

Referring to FIG. 7, a specific design of the engine is shown. Letting angles A, B, C, and D be, respectively, a slant angle of the center line 15 of an upstream straight portion of the swirl port 10 relative to an interface 26 between the cylinder block 3 and the cylinder head 4, an angle of a center line 27 of the intake valve 12 for the swirl port 10 relative to a vertical center line 28 of the cylinder bore 2a, a bevel angle of the generally conically-shaped valve head 12A of the intake valve 12 relative to the center line 27 of the intake valve 12 (which is a base angle of the conical surface of the generally conically-shaped valve head 12A), and an angle of a center line 29 of the exhaust valve 14, which is disposed oppositely to the intake valve 12 with respect to the center line 28 of the cylinder bore 2, relative to the center line 28 of the cylinder bore 2, the engine is designed so as to have the relative angles satisfying the following formulas:

$$C \geq A+B \qquad (1) \text{ and}$$

$$C \geq B+D \qquad (2)$$

In the engine thus structured, letting a bevel angle of the conical surface X of the valve head 12A of the intake valve 12, on a forward side of an intake air flow with respect to the center line 27 of the intake valve 12 (which is hereafter referred to as an intake air guide face), relative to the under surface 26 of the cylinder head 4, be "Θ" the following formula is satisfied:

$$\Theta = C - B \qquad (3)$$

From the formulas (1) to (3), the bevel angle Θ of the intake air guide face X of the valve head 12A can be defined as follows:

$$\Theta \geq A$$

In other words, the bevel angle Θ of the intake air guide face X of the valve head 12A of the intake valve 12 is greater than the slant angle A of the upstream straight portion of the swirl port 10. This indicates that an intake air flow, entering at the slant angle A into the combustion chamber 6 through the swirl port 10, passes over the valve head 12A of the intake valve 12 without being changed in flowing direction by the intake air guide face X, so as to reduce resistance of the intake air flow against the valve head 12A of the intake valve 12, allowing the intake air flow to be introduced into the combustion chamber 6 without any drop in intensity of flow.

On the other hand, since an angle of the under surface of the valve head 14A of the exhaust valve 14 relative to the under surface 26 of the cylinder head 4 is equal to the angle D of the center line 29 of the exhaust valve 14 relative to the center line 28 of the cylinder bore 2, the bevel angle $\Theta$ of the intake air guide face X of the valve head 12A of the intake valve 12 is represented as follows:

$$\Theta = C - B$$

From the formula (2), the bevel angle $\Theta$ is defined as follows:

$$\Theta \geq D$$

This indicates that if the bevel angle $\Theta$ is smaller than the angle D of the center line 29 of the exhaust valve 14 relative to the center line 28 of the cylinder bore 2 ($\Theta < D$), then the exhaust valve 14, in its closed position, which is positioned forward of the intake valve 12 with respect to the intake air flow, places the under surface of its valve head 14A so as to face the intake air guide face X of the valve head 12A of the intake valve 12. However, as long as the bevel angle $\Theta$ is equal to or larger than the angle D of the center line 29 of the exhaust valve 14 relative to the center line 28 of the cylinder bore 2 ($\Theta \geq D$), the intake air introduced into the combustion chamber 6 flows without impinging on the under surface of the valve head 14A of the exhaust valve 14. This angular arrangement of the intake and exhaust valves 12 and 14 leads to reducing resistance of intake air flow against the valves. As a result, intake air is charged into the combustion chamber 6 at an increased rate. In this particular engine, intake air is introduced into the combustion chamber 6 through the swirl port 10, without weakening of its strength of flow, so as to generate a strong swirl flow in the combustion chamber 6.

Figure 8:
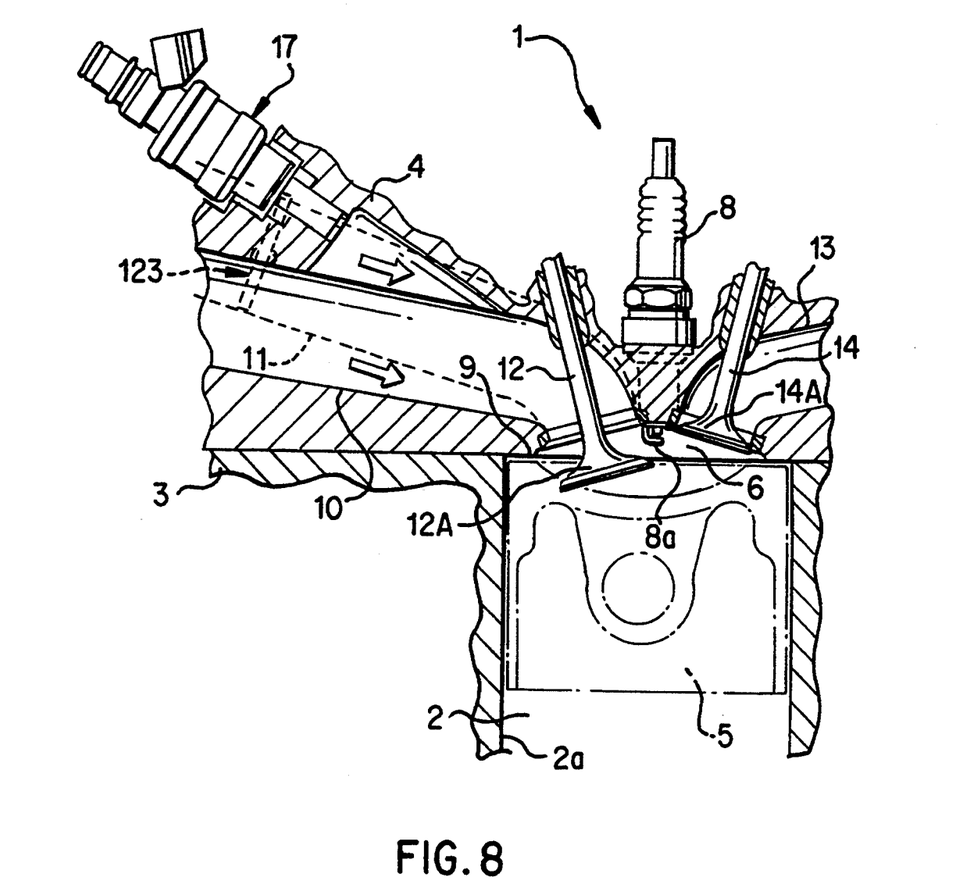
FIG. 8 is a sectional view of a combustion chamber structure according to another preferred embodiment of the present invention.
Figure 9:
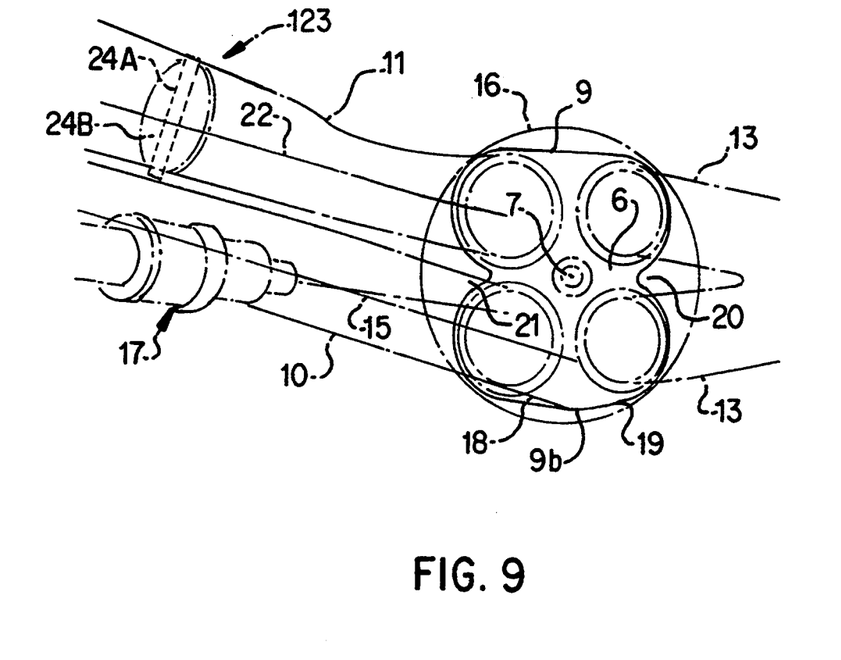
FIG. 9 is a plan view of a cylinder head of the combustion chamber shown in FIG. 8.

Referring to FIGS. 8 and 9, a combustion chamber structure according to another preferred embodiment of the present invention is shown. Because all elements and arrangements, excepting a shutter valve disposed in a secondary port, are the same in structure and operation as those of the previous embodiment, the following description will be directed primarily to the shutter valve.

Secondary port 11, which is formed so that its center line 22 points towards almost the center of the combustion chamber 6, is provided with a shutter valve means 123, which is closed to shut the secondary port 11 while the engine operates at lower loads so that only the swirl port 10 supplies intake air into the combustion chamber 6. The shutter valve means 123 comprises a valve shaft 24A and a shutter blade 24B. The shutter blade 24B is fixedly supported for turning movement by the valve shaft 24A, which is perpendicular to the center line 22 of the secondary port 11 and extends substantially horizontally and is rotatable with respect to the secondary port 11. The shutter valve means 123 is designed and adapted to forcibly deflect and direct an intake air flow in the secondary port 11 towards an upper portion rather than a lower portion of the combustion chamber 6 when it is opened.

Shutter valve means 123, thus arranged, allows intake air to flow mostly over the upper half of the shutter blade 24B when it is opened. Consequently, an induction turbulence of intake air is enhanced or strengthened at the end opening of the intake port 11 of the combustion chamber 6, i.e., a cylinder bore 2. This increases the charging efficiency of intake air charged into the combustion chamber 6 without effecting or producing a swirl flow of intake air in the combustion chamber 6.

It is to be understood that although the present invention has been described in detail with respect to preferred embodiments thereof, various other embodiments and variations may occur to those skilled in the art. Any such other embodiments and variations which fall within the scope and the spirit of the invention are intended to be covered by the following claims.

What is claimed is:

1. A structure of a combustion chamber for an engine comprising a cylinder block formed with a cylinder bore therein and a cylinder head formed with a generally conically-shaped under wall, said cylinder head being mounted on said cylinder block so as to form a combustion chamber between said cylinder bore, said generally conically-shaped under wall and a piston in said cylinder bore, said structure of the combustion chamber comprising:

an intake port formed in said cylinder head and opening into said combustion chamber, a major straight portion of the intake port being formed so that a lower wall section of the major straight portion is elongated and extends straight from an upstream location to approximately an end opening portion of the intake port, a hypothetical line extending from the lower wall section of the major straight portion into the combustion chamber being located apart from a downstream end portion of an upper wall section of an end opening of the intake port and a center line of the major straight portion of said intake port being at an angle A relative to an interface between said cylinder head and said cylinder block; and an intake valve having a generally conically-shaped valve head and installed at an angle B relative to a vertical center line of said cylinder bore in said cylinder head so as to open and close said intake port, said generally conically-shaped valve head having a base angle C, said angles A, B and C satisfying the following formula:

$$C \geq A + B.$$

2. A combustion chamber structure according to claim 1, wherein said intake port opens into said combustion chamber so as to introduce and direct an intake air flow closer to a marginal portion of said combustion chamber than a central portion of said combustion chamber, thereby generating a swirl flow of intake air in said combustion chamber.

3. A combustion chamber structure according to claim 1, and further comprising an exhaust port formed in said cylinder head and opening into said combustion chamber, and an exhaust valve having a generally conically-shaped valve head and installed oppositely to said intake valve with respect to said vertical center line of said cylinder bore at an angle D relative to said vertical center line of said cylinder bore in said cylinder head so as to open and close said exhaust port, said angle D satisfying the following formula:

$$C \geqq B+D.$$

4. A combustion chamber structure according to claim 3, wherein said intake port opens into said combustion chamber so as to introduce and direct an intake air flow closer to a marginal portion of said combustion chamber than a central portion of said combustion chamber, thereby generating a swirl flow of intake air in said combustion chamber.

5. A combustion chamber structure according to claim 1, wherein an upper wall section of the major straight portion of the intake port is elongated and extends straight from an upstream location approximately to a contacting point between the cylinder head and a shaft of the intake valve.

6. A structure of a combustion chamber for an engine comprising a cylinder block formed with a cylinder bore therein and a cylinder head formed with a generally conically-shaped under wall, said cylinder head being mounted on said cylinder block so as to form a combustion chamber between said cylinder bore, said generally conically-shaped under wall and a piston in said cylinder bore, said structure of the combustion chamber comprising:

an intake port formed in said cylinder head and opening into said combustion chamber, an upper wall section of a major straight portion of the intake port being elongated and extending straight from an upstream location approximately to a contacting point between the cylinder head and a shaft of the intake valve, a lower wall section of the major straight portion of the intake port being configured so that a hypothetical line extending from the lower wall section into the combustion chamber is located apart from an upper wall section of an end opening of the intake port and a center line of the major straight portion of said intake port being at an angle A relative to an interface between said cylinder head and said cylinder block; and an intake valve having a generally conically-shaped valve head and installed at an angle B relative to a vertical center line of said cylinder bore in said cylinder head so as to open and close said intake port, said generally conically-shaped valve head having a base angle C, said angles A, B and C satisfying the following formula:

$$C \geqq A+B.$$

* * * * *